(12) United States Patent
Norris, III

(10) Patent No.: US 8,438,188 B2
(45) Date of Patent: May 7, 2013

(54) ALTERNATING-MENU QUAD-NAVIGATOR

(76) Inventor: Forbes Holten Norris, III, Princeton, NJ (US)

(*) Notice: Subject to any disclaimer, the term of this patent is extended or adjusted under 35 U.S.C. 154(b) by 0 days.

(21) Appl. No.: 13/095,054

(22) Filed: Apr. 27, 2011

(65) Prior Publication Data

US 2011/0264996 A1    Oct. 27, 2011

Related U.S. Application Data

(63) Continuation of application No. 10/558,773, filed as application No. PCT/US2004/017480 on Jun. 3, 2004, now Pat. No. 7,962,522.

(60) Provisional application No. 60/475,410, filed on Jun. 3, 2003.

(51) Int. Cl.
*G06F 17/30* (2006.01)

(52) U.S. Cl.
USPC .......... 707/792; 707/793; 707/805; 715/810; 715/817; 715/825

(58) Field of Classification Search ........................ None
See application file for complete search history.

(56) References Cited

U.S. PATENT DOCUMENTS

| | | | | |
|---|---|---|---|---|
| 5,970,471 | A | * | 10/1999 | Hill .............................. 705/26.8 |
| 6,199,082 | B1 | | 3/2001 | Ferrel et al. |
| 6,687,704 | B1 | | 2/2004 | Russel |

OTHER PUBLICATIONS

Thezone.net. <http://web.archive.org/web/20020219153251/http://home.thezone.net/~rbennett/utility/javahead.htm>. Feb. 21, 2002.*

* cited by examiner

*Primary Examiner* — Syed Hasan
(74) *Attorney, Agent, or Firm* — Gearhart Law, LLC

(57) ABSTRACT

A method of displaying and navigating information using a hierarchical, spring loaded DHTML menu system that adjusts to fit the boundaries of a resizable, container. A set of standard HTML table row elements, having a hierarchical dependency, is consistently displayed as a web-page, under reasonable resizing. This is done using a strut row that produces the largest width requirement when the table structure is resizing to occupy a small width. Only the current row elements and the strut element are required in calculating table resizing to ensure that whichever data elements are displayed when a web-page resizing occurs, the browser auto-layout algorithm calculations will result in a resize attributes that enables all other row elements of that menu to be accommodated by the newly determined table width. As the row elements may themselves be table structures, nested menus of information may be displayed and navigated.

5 Claims, 13 Drawing Sheets

ALTERNATING-MENU QUAD-NAVIGATOR

CROSS REFERENCE TO RELATED APPLICATIONS

This application is a continuation application of U.S. patent application Ser. No. 10/558,773 filed on Dec. 2, 2005 now U.S. Pat. No. 7,962,522, by Forbes Holten Norris III titled "Flexible, Dynamic Menu-Based Web-page Architecture", the contents of which are hereby incorporated by reference. U.S. patent application Ser. No. 10/558,773 is in turn related to, and claims priority from U.S. Provisional Patent application No. 60/475,410 filed on Jun. 3, 2003 by Forbes Holten Norris, III, titled "FlexMenuPage: DHTML menus that define a new web page architecture" and to PCT/US04/17480 filed on Jun. 3, 2004 by Forbes Holten Norris, III Flexible, Dynamic Menu-Based Web-page Architecture", the contents of both of which are hereby incorporated by reference.

FIELD OF THE INVENTION

The present invention relates generally to web browsers, web pages and dynamic HTML (DHTML) technologies, specifically to web page architecture and hierarchical menu systems for web pages.

BACKGROUND OF THE INVENTION

The Internet provides access to almost infinite amounts of information, but current web technology makes it difficult to navigate through large amounts of data. Web pages are also very difficult to build such that they are flexible in size, and generally lack most of rich, highly developed features and functionality found in traditional graphical user interfaces (GUIs).

For example web pages are very difficult to properly format, making it nearly impossible to dynamically resize and adjust them for optimum viewing on different screens, variable browser window sizes and differing user visibility requirements. This is particularly a problem on small or compact screens such as those found on mobile devices.

Currently there exists a number of methods and techniques to workaround these formatting shortcomings. One standard technique is to simply make web pages completely static or rigid in size.

Users can currently navigate web pages by clicking on links or by scrolling. However, if the web page is large and complex, these mechanisms can be cumbersome. The alternative is to break the web page into smaller chunks, which requires the user to frequently request new pages from the web server; this can potentially be very slow depending on the server and the web connection speed. An alternative to this approach is for the web browser to cache raw unformatted data, for example in XML form, then transform the data as needed into HTML however such transformations can also be slow.

Another approach to improving web page functionality is by use of "plug-in" technology, essentially extensions to the web browser. An example is Macromedia's Flash product. The drawback to plug-ins is that it uses, non-standard proprietary software that has to be installed and kept up to date on the user's computer, and web pages have to be written to conform to a specific plug-in technology. Plug-ins can also potentially pose security risks.

Another popular navigational approach is hierarchical menus systems based on dynamic HTML (DHTML) where the web page displays menus of links (URLs) organized in hierarchical fashion. These menus can be navigated and displayed just by cursor/pointer movement, commonly referred to as "spring loaded".

Present spring loaded menu systems are useful, but have many limitations: They are very difficult to place in a web page anywhere except the top upper left position; They can't be dynamically resized or reconfigured without rebuilding or recalculating the entire menu, a very slow process. They use more screen space and require the pointer device to travel farther than necessary, as each menu group generally needs to have a uniform width, that of the widest menu group item label. Other drawbacks are that such menu systems have no way of displaying menus of non-uniform size and shape, and they also obscure the web page underneath.

Another serious drawback to current DHTML hierarchical menus is that they tend to require a great deal of browser code (also known as product) and version specific code and tricks, making such menu applications hard to maintain and customize.

What is needed is a hierarchical, spring loaded DHTML menu system that can easily fit into any location on a web page, and which smoothly and automatically adjusts its size to fit exactly within the boundaries of its containing web page element or location.

SUMMARY OF THE INVENTION

The present invention relates to displaying and navigating information in web browsers as hierarchical, spring loaded DHTML menu systems that can easily fit into any location on a web page, and which smoothly and automatically adjusts in size to fit within the boundaries of as containing web page element.

The inventive concepts will now be described in detailed by reference to the accompanying drawings, in which like numbers refer to like elements, and to the accompanying appendix of definitions.

In a preferred embodiment, information for a web-page may be configured to be a set of row elements suitable for use in a standard HTML table structure. The row elements may also have a hierarchical dependency, thereby constituting a menu. Depending on where in that information hierarchy a user has navigated to, a particular subset of row elements are displayed as a web-page in the web-browser.

In a preferred embodiment of the invention, a standard HTML table structure is used to consistently and efficiently display the required sub-set of row elements as part or all of a web-page, under all reasonable resizing of the page, by means of a strut row. The strut row may be a row element that, when placed in a standard HTML structure which is being resized to occupy a small width, produces the largest width requirement.

The strut row may be found by, for instance, taking each row element in turn, placing that row element in a standard HTML table structure, and then attempting to display the table as an HTML table. In doing so, a standard auto-layout algorithm will calculate a minimum table width required to display that row. The strut row is the row element found to require the largest minimum-table-width.

Having found the strut row, all future calculations of table width requirements can be done efficiently by including only the row elements currently required for display and the strut element. This may be done by, for instance, always including the strut element as a non-displayed row element in the current sub-set of row elements to be displayed. This ensures that no matter which subset of data elements are currently being displayed, when a web-page resizing occurs, the display resize attribute, such as font size, chosen by the browser auto-layout algorithm will allow all other row elements of that menu to be displayed within the newly determined table width.

In a further embodiment of the invention, one or more of the row elements may be a table structure, thereby allowing nested menus of information to be displayed and navigated.

These and other advantages will be described in greater detail below by reference to the accompanying drawings.

BRIEF DESCRIPTION OF THE DRAWINGS

Figures 12F, 12G, 12H:
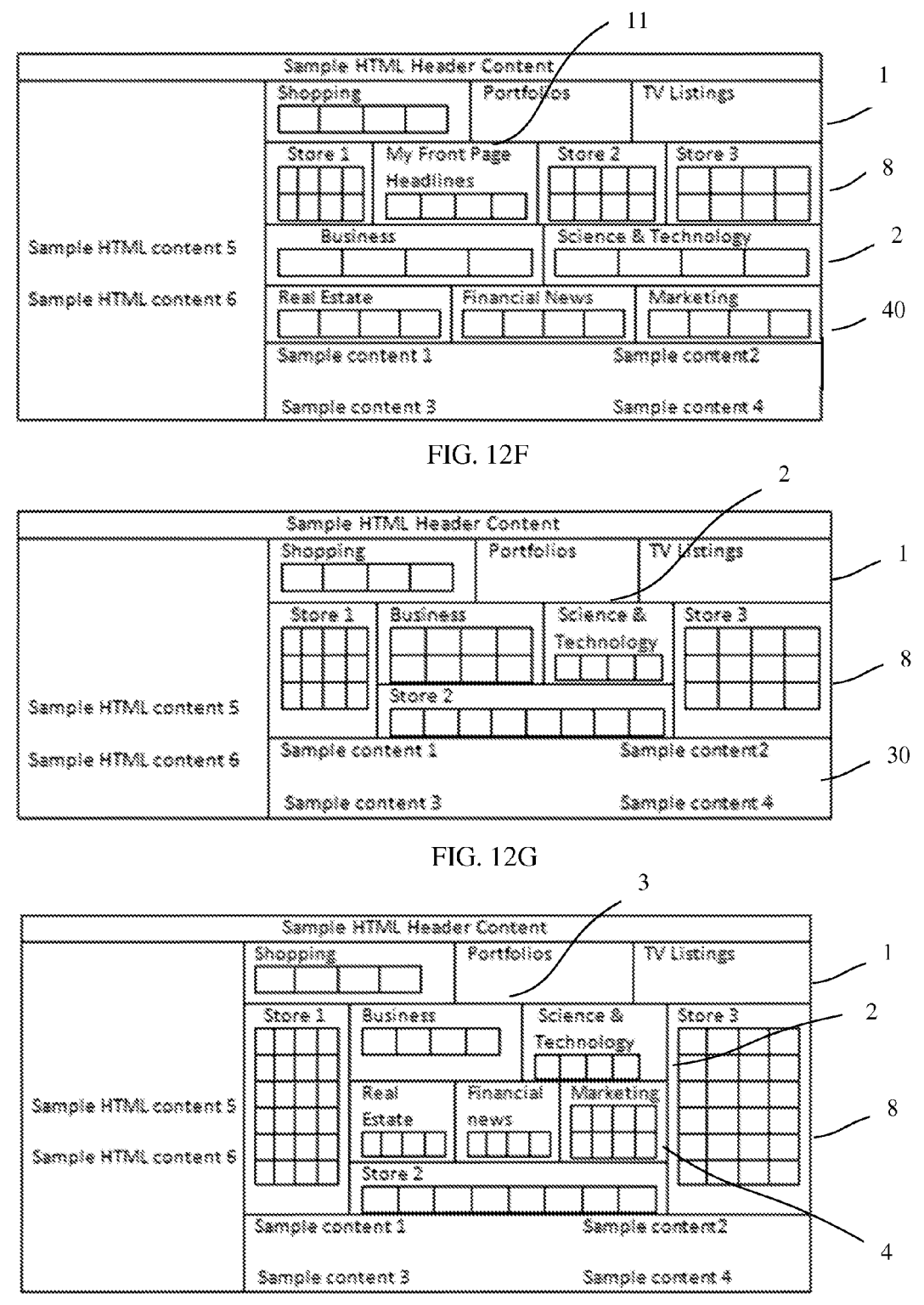

FIG. 12F shows conclusion of a drag and drop operation merging 2 independent menu row hierarchies, with resulting new menus/submenus displayed together.

FIG. 12G shows conclusion of drag and drop operation where one independent menu hierarchy has become nested inside another independent menu hierarchy, but without merger or editing of the hierarchies.

FIG. 12H shows 2 independent menu hierarchies, with one nested inside the other, where both menu systems have permanent menu rows displayed, including padding block actions to create vertical spacing.

DETAILED DESCRIPTION

Figure 1:
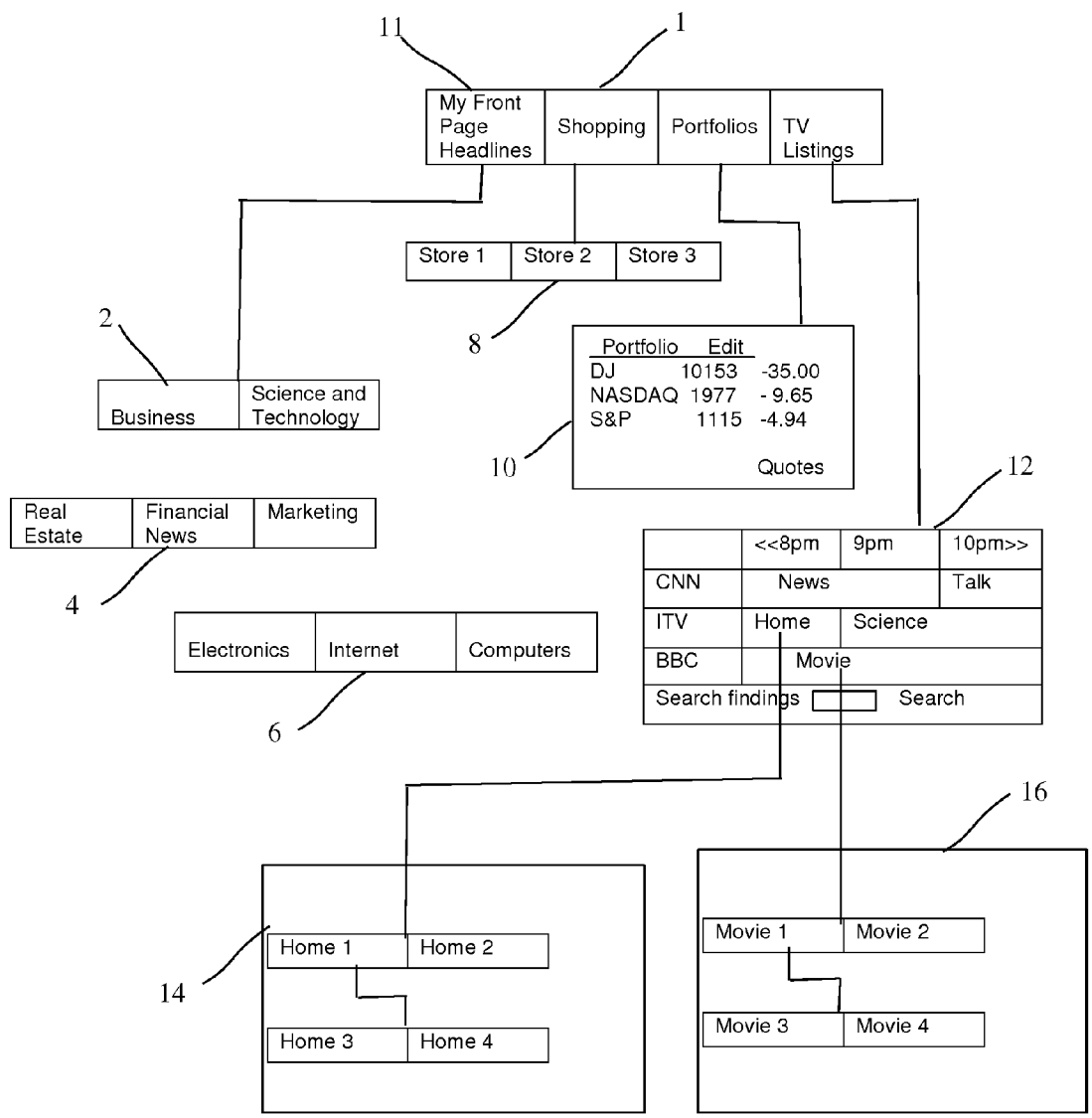
FIG. 1 shows 3 basic independent menu row hierarchies.
Figure 2:
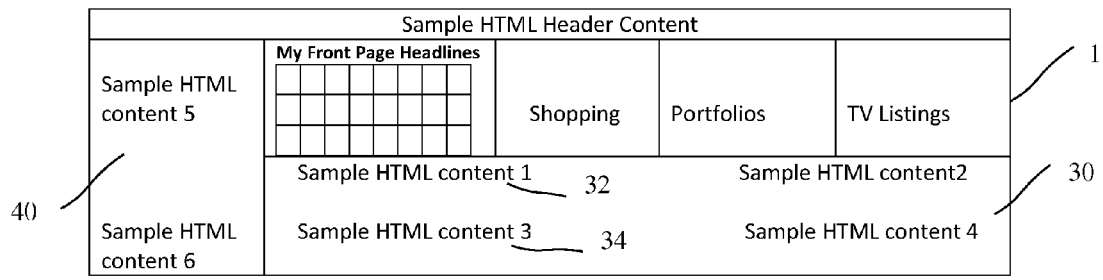
FIG. 2 shows starting sequence of basic table menu navigation.

The present invention relates to displaying and navigating information in web browsers as hierarchical, spring loaded DHTML menu systems that can easily fit into any location on a web page, and which smoothly and automatically adjusts in size to fit within the boundaries of as containing web page element.

In a preferred embodiment of the invention, each time a user goes to a web page, the FlexMenuPage algorithms dynamically builds and inserts menus into the page, or the menus are restored from a cache mechanism. The user can enter a menu tree through any displayed menu(s), normally the top menu or any permanently displayed menus.

The menu system logic may be dynamically included in each web page where menus will be used, and can be included inside each web page directly, usually in a script form. The logic can be also loaded from a disk or storage device local to the web browser.

This logic can be encapsulated in any number of web browser HTML DOM manipulation technologies, such as a scripting language native to the web browser, where examples would be Microsoft VBScript or Jscript, JavaScript. The logic can also reside in browser "plug-ins", usually external compiled code, loaded by the browser, which effectively extends the browser functionality. Examples of plug-ins are Java Applets, Microsoft ActiveX technology, and Flash Macromedia.

On loading into the browser, each web page may also include a description of the menu or menus to be displayed— the descriptions can be stored with the menu system logic, or can be separately located, included with the web page HTML or loaded from a local storage, such as a computer memory or a disk device. If local storage, menu definitions can be stored in what's commonly called "cookies", a standard browser method for storing various state information. Cookies can also be used to store menu system logic that is in script (non-compiled) form.

Operation: Menu descriptions are read and interpreted by the menu system logic when building menus, usually, but not limited to, when browser loads a web page. Another circumstance could be upon a dynamic request to create a new menu—for example, the user may request a new instance/copy of a calendar menu system or a notepad menu.

Each web page contains or loads FlexMenuPage code and menu definitions, including any user preferences that might be stored locally on the computer, usually as cookies.

Upon loading of the web page, menus structures are built by traversal of the menu data definitions. Menu elements are dynamically created by use of the document object model interfaces (DOM).

Next, there is an initialization phase in which HTML from the web page is copied or moved into menu items, sizing characteristics for each menu table are identified, and the initial size of each menu group is calculated.

If HTML is to be copied or moved into a menu item from the main web page, the menu builder code waits until the DOM browser makes that piece of the web page available.

Next, each menu is placed in its specified web page location, either in the web page or in another menu if a nested or embedded menu. In technical terms, each menu is inserted as a child element of its parent block level element location. Following insertion, each menu is sized to fit inside its parent element location.

Fitting Table Based Menus into Page Locations:

Controlling the sizing of flexible and variable sized table based menus turns out to be extremely difficult. Here's why: The present CSS specification uses the absolute positioning attribute to remove a block element and descendant nodes from the document flow of the larger parent page.

The CSS spec says that absolutely positioned block elements should be contained by their static parent block element, however, my research shows that this is a contradictory and difficult requirement for a web browser to accomplish, primarily because an absolutely positioned element is by definition removed from the larger page document flow. If the static parent element were to truly contain an absolutely positioned child element that is dynamically changing in size, then the entire page might require recalculation. In practical terms, this means that an absolutely positioned block (for example an HTML table) too large in dimension will generally overwrite and cover other page elements near it. In order to prevent this from happening, the table must be sized to properly fit inside of its parent block element.

However it turns out to be extremely difficult to keep flexible size table based menus a uniform width when dynamically inserting or removing rows. Part of problem is that in most browsers proper table formatting, including uniformity of row sizing, seems to require that the entire group of rows to be displayed be present in the table during the formatting calculation. This is particularly a challenge when the table has rows of very different widths/sizes. However, keeping all possible displayable rows in a table causes performance problems if you want the menu table to be able to dynamically resize through font size changes.

Another problem is that such rows can overlap and cover areas of the table's parent page. These rows can be made invisible, but because they still share the same object layer value of their parent table they will still de-activate the page areas they invisibly cover—for example links or URLs in such page areas will not be usable One possible workaround for table sizing problems is use of the CSS min-width element setting, however, this is generally not supported by most major browsers, and even if supported for table elements, is still is not likely to solve the complex formatting issues of rapid and dynamic table row insertion and removal. Part of this limitation is likely due to potential performance problems—rapid row insertion and removal could cause the entire table to require time consuming reformatting calculations. Another possible workaround is for the table menu to have a fixed and static size, but this will cause the menu to not to be able to react to changes in the page size or dimensions.

In a preferred embodiment, the present invention inserts a special table row, called the strut, into the table menu during resizing to keep menu table rows a uniform size while resizing.

Determining Menu Table Strut Row and Sizing Characteristics: Purpose of the Strut Row: Alternating Menu Operation FIGS. 13A-J shows the user navigating the alternating rows by use of the quad control, where each toggle movement first shows or hides the menu row opposite the cursor position, before then alternating the quad control diagonal activators on/off. The advantage of this design is that the user gestures while using the quad control exactly mirror the normal alternating menu row display mechanism—thus the quad actions of hide/show menu rows always occurs in the opposite direction of the where cursor is located, just as in the normal alternating menu function. This allows the user to dismount the quad menus into the menu row they intended to land in, without crossing other menu items and causing unwanted opening of submenu rows not of immediate interest.

Strut Operations: Dynamic Editing of Menu Table Row Hierarchies

This functionality involves breaking a single menu system into multiple menu systems (breaking apart a single independent menu hierarchy into multiple independent hierarchies), or merging multiple independent menu hierarchies into single larger menu hierarchy.

Figure 15:
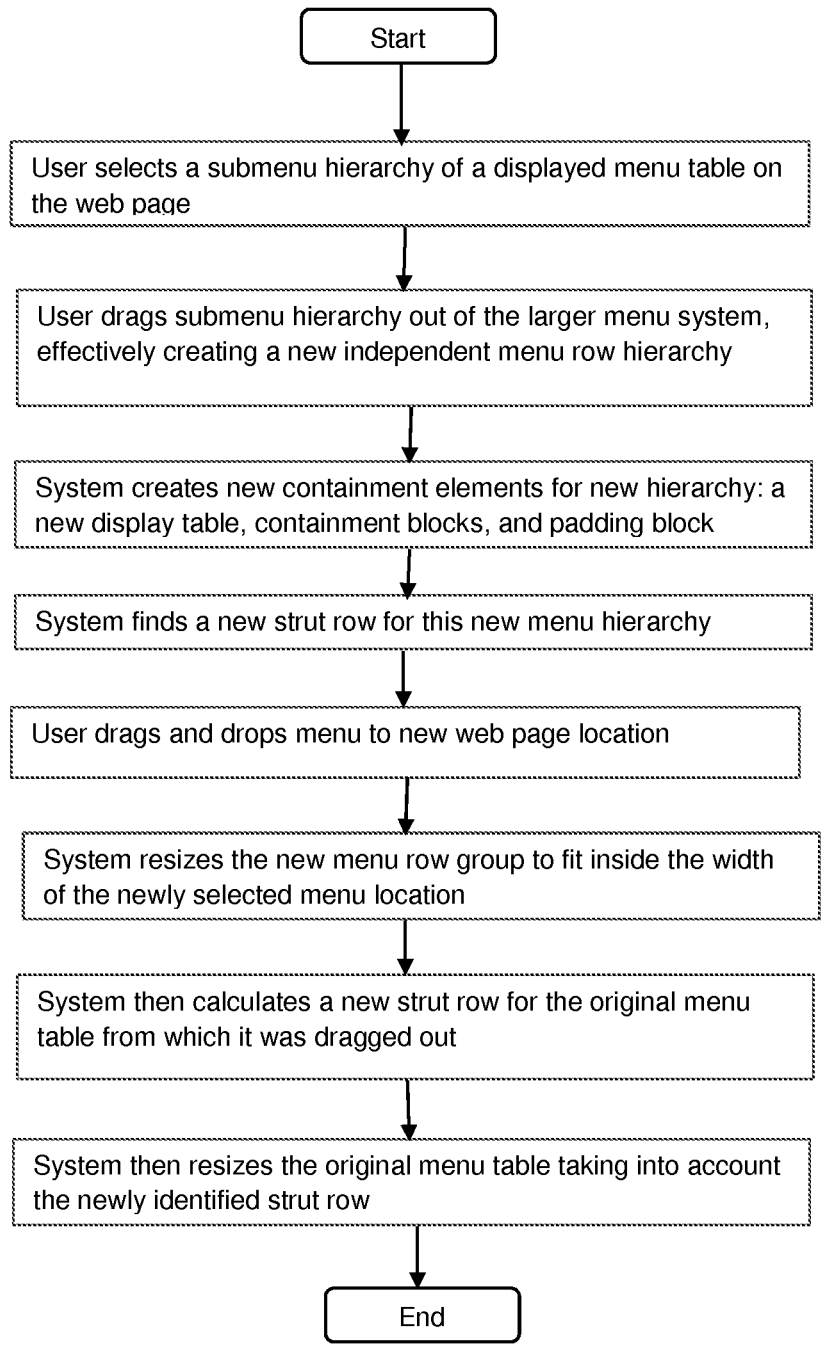
FIG. 15 shows the flow chart logic of how a menu hierarchy is edited to create 2 menu systems from one.

Breaking apart a menu hierarchies to create multiple independent hierarchies (this is described in FIG. 15).

Figure 12A:
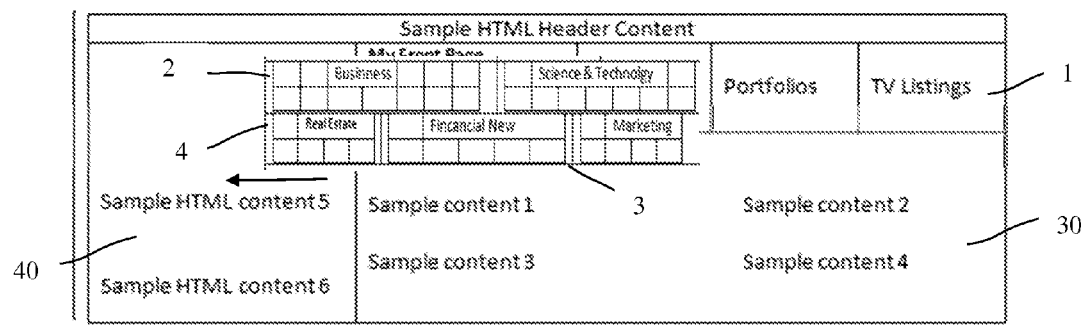
FIG. 12A shows a menu row sub-hierarchy being edited, dragged ("torn off") out of it's parent menu hierarchy system.

1. User selects the menu system sub-hierarchy. In the preferred embodiment user uses a pointer device to position the cursor in the target menu region associated with a hierarchy of submenus (usually a menu cell) then either selects an move action, (typically from a right-click menu popup), or simply selects a drag hot spot, located in the menu cell or region. FIG. 12A shows a selected menu hierarchy being dragged (tear off) out from it's parent menu row hierarchy (shown with the root/top menu row 1.

Figure 12B:
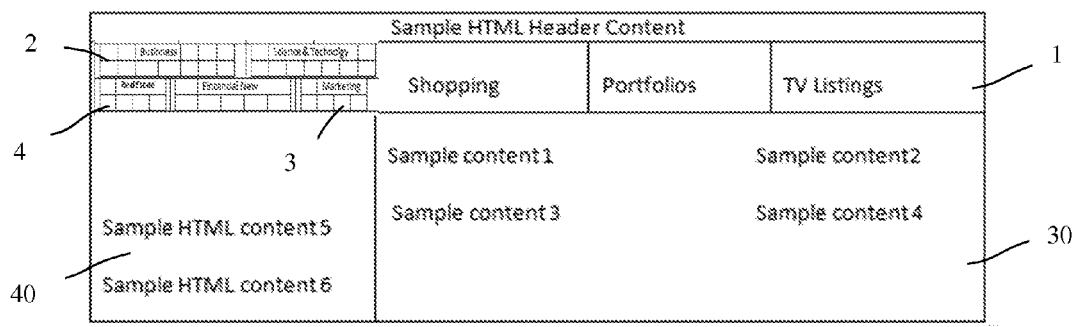
FIG. 12B shows the same menu row sub-hierarchy being dropped into a new web page location.

2. User drag's and drops to another web page location (which could be inside another menu system) If a table menu row system, find a new strut row for the new, independent menu hierarchy. FIG. 12B shows the resulting new menu hierarchy with a new strut being found and used to calculate the width dimensions to fit in the new location, left column 40.

3. System resizes the menus to fit the new location, using the new strut.

Merging multiple menus into a single menu (merging multiple independent menu hierarchies into a single menu hierarchy):

User selects first menu system (this could be a submenu hierarchy of an independent menu system).

In the preferred embodiment, the user can next drag and drop the selected menu system to a location in a second menu, where the drag process can involve using the cursor movement to open up submenus of the second menu.

The user can user the cursor to the target drop location menu cell item.

At conclusion of the drop, the 1st menu system becomes grafted/merged into the 2nd menu system hierarchy, while also creating a new sibling menu item cell of the target menu row.

This effectively adds a new sub hierarchy branch to the 2nd menu system hierarchy. The system reconfigures the components of the new sub hierarchy branch to point to the new hierarchy top menu row and also menu table container. The system then, finds a new strut row for the newly expanded hierarchy.

This merging is shown in FIGS. 12C-12F, where the user drags a smaller menu into a larger menu, with the result shown in FIG. 12F, which shows a merger of the menu rows 1, 8, 2, 4.

Alternatively, the user could choose to drop the dragged menu system inside another menu system, creating a nested menu inside of another unrelated menu system—this is shown in FIG. 12H, where the independent menu system with rows 2,4 is shown nested inside another menu system with rows 1, 8. FIG. 12H also shows that the nested menu system uses it's padding block to push down content inside the menu cell where it is located.

The resize algorithm uses font sizing to help fit a menu table into the dimensions of its web page location. The resize method rapidly tests the dimensions of the table (relative to the target dimension) by applying progressively larger or smaller font sizes to the table. For this to work, however, all menu rows in the table's menu row hierarchy have to be present at the same time in the table during it's resizing. However, if the hierarchy is large, this could create severe performance problems.

A complex problem: each table menu may have many rows, each containing many HTML elements of varying sizing characteristics. For example a menu row can contain myriad of font size styles that change size at differing rates; it can also contain static images or other strut like elements that can create a minimum width beyond which the row cannot narrow. Each menu item (table cell) in the row can also contain label text of varying string lengths, and so the exact dimensions that a row (really a group of menu items) will produce as it narrows are extremely hard to predict. So it can be extremely difficult to understand exactly how the overall table dimensions will size in reaction to different font sizes, or from changes to the web page dimensions. To work around this problem, we size the table instead to its largest, widest row. This enables the system's to accurately resize a table menu with enormous speed and low processing overhead.

However, it can be generally observed that the width of html block elements is largely determined by 3 factors:

The innate width of the contained elements

For example, an image has certain dimension. Other contained elements may have minimum widths computed by combinations of various CSS dimensional settings (margins, padding, width, static font sizes, etc); the width setting applied to the element contents (which causes both word wrapping of text, and wrap around/push down of other content, thus narrowing of element width), An example of this is an HTML table element's CSS width setting.

The computed font size, or other computed sizing (usually through CSS inheritance) applied to the element contents through parent elements. An example is how a font size set on an HTML table element affects the font sizing of it's constituent table cells.

It can also be observed that one or two wider rows are the most important determinants in the sizing characteristics of a given table, in part because word wrap and element wrapping in table cells (resulting in narrowing) happens first in wider rows with denser content and relatively less white space, before it occurs in narrower rows that are less content dense with relatively more white space.

It is likely that these observations may also have generalized application to the general problem of dynamically sizing any HTML block elements. Therefore, it's likely that some subset of a block element's child elements (in the browsers HTML DOM tree hierarchy) may be used to substitute for the block element's entire content in sizing conditions, which involve dynamic addition or removal of child elements from a block element's page flow sizing calculations, including re-sizing achieved by the application of font sizes.

Figure 16:
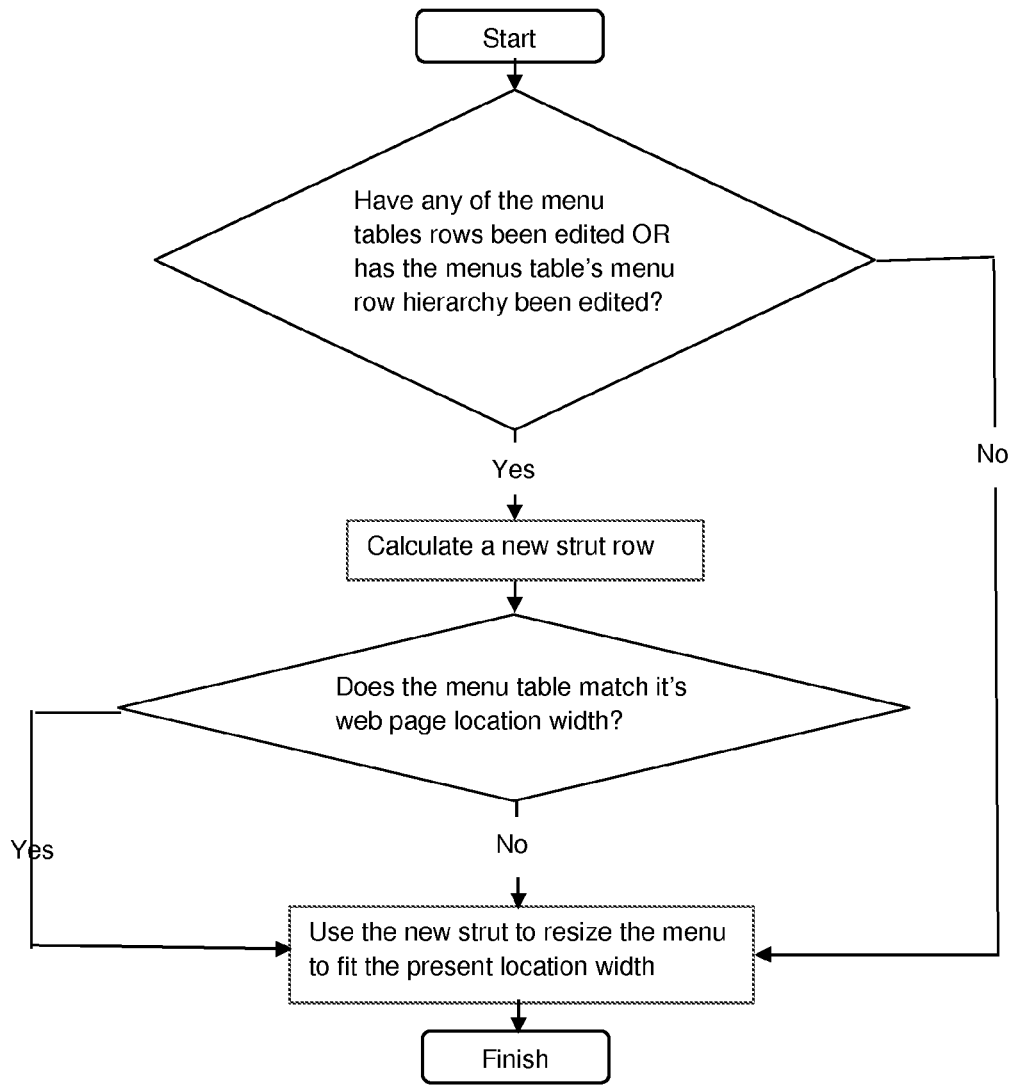
FIG. 16 shows the flow chart logic of how and when the menu table strut is recalculated and then used to adjust menu sizing.
Figure 17:
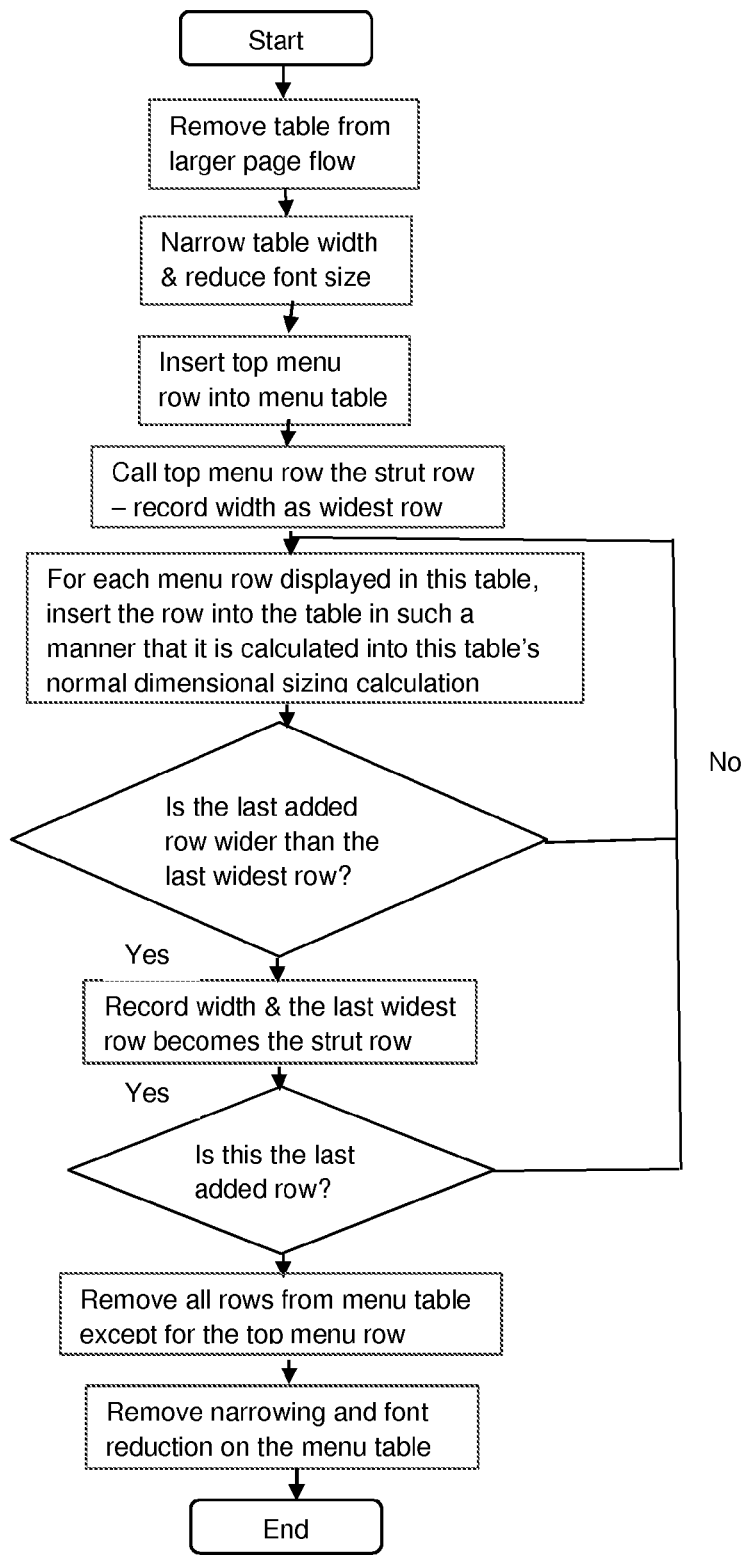
FIG. 17 shows a process flow chart describing the algorithm for finding menu table strut row.

To find the strut, the system runs a series of tests to pre-sample the sizing characteristics and behavior of each menu table group, by simulation of various sizing conditions. This algorithm is shown in FIG. 17. Also, FIG. 16 shows decision making for re-calculation of a new strut when menu hierarchies or their components rows are edited. FIG. 12A and FIG. 12B show the dynamic editing of menu row hierarchies, whereby 2 independent hierarchies are created from one original one, via a drag and drop operation.

Prior to running the tests the table is made invisible so that it doesn't appear on the screen.

Next the table is placed outside the normal page flow, so that it's sizing calculations do not cause the larger page to be recalculated, which would cause unacceptable slowness, and would also cause the page to jerk in size.

Next we force the table width to narrow to a very small width. In the preferred embodiment, this narrowing can be accomplished by setting the table's CSS width property to a very small value.

In addition, there are also many other methods (alternative embodiments) for achieving this same narrowing effect—for example, the table could be forced to narrow by a narrowing of the table's parent block element.

Although it is not required, in the preferred embodiment, we also set a very small table font size, which in conjunction with the forced narrowing, helps more accurately reveal the table sizing behavior.

Next, each of the menu rows in the table's menu row hierarchy, in no particular order, may be added into the table. In a preferred embodiment, the system simply recursively walks the entire menu row hierarchy tree, adding each menu row found to the table structure. In technical terms, when a row is added to a table, it is added to the table's page flow, and therefore affects the sizing and dimensions of the table.

In alternative embodiments, the system can also test table sizing behavior using different font sizes. In the preferred embodiment, this operation could also test for possibly multiple strut rows, since the widest table menu row can vary under different conditions.

The system may use an actual table row as the strut instead of other mechanisms since this is the only way to gauge the composite sizing behavior and changing dimensions of a given table under different conditions.

Because the table menu may be removed from the parent page flow, this testing operation occurs extremely rapidly without side effects to the larger page. For this reason, it is possible to alter menu structure on the fly and then to recalculate the strut row without significant performance penalties.

During this test operation, the system also tests for the menu table minimum width because we know that some menu rows cannot squeeze down past a certain size, no matter what font size is set on the larger menu table. For example a menu row that contains lots of images has a finite limit to how far down it can size down due to the static nature of the embedded images. The minimum width helps prevent us from fruitlessly applying smaller and smaller font sizes to the menu table long past when the menu table has reached its minimum size.

Other sizing behaviors we can test for are table menu height/width ratio—this can be used to make sure the menu table keeps a certain shape which can be used to prevent font sizing from becoming either too big or too small, and help enforce menu dimensions that both maximize readability and easier navigation.

In some circumstances, the strut row found may work less than optimally.

For example, it could be so large as to pose a performance problem during resizing operations. In such cases, an alternative strut can be found, for example a child element of the strut row.

For example, if the original very large strut row contains a table, a slight twist of the normal strut finding algorithm could be applied: instead of adding each row and recording the table dimension, REMOVE each row one by one to see what sizing effect each row was having on the table.

A strut finding process could be run on the strut row, producing a smaller child element of the strut row which can act as a substitute.

Alternatively, a synthetic row element can be constructed with similar width sizing characteristics as the strut row.

If the strut row is unusually large such that it would pose a performance drag, other more lightweight strut mechanisms can be used. For example, the system can construct a character height row that will shrink and grow in width as different font sizes are applied to the table menu. But the downside is that this simulated strut will not have the exact sizing behavior of the actual strut row.

Dynamic Editing of Menu Table Row Hierarchies

Breaking a single menu system into multiple menu systems. (breaking apart a single independent menu hierarchy into multiple independent hierarchies). How this is accomplished:

1. User selects the menu system sub-hierarchy. In the preferred embodiment user uses a pointer device to position the cursor in the target menu region associated with a hierarchy of submenus (usually a menu cell) then either selects an move action, (typically from a right-click menu popup), or simply selects a drag hot spot, located in the menu cell or region. FIG. 12A shows a selected menu hierarchy being dragged (tear off) out from it's parent menu row hierarchy (shown with the root/top menu row 1.

2. User drag's and drops to another web page location (which could be inside another menu system) If a table menu row system, find a new strut row for the new, independent menu hierarchy. FIG. 12B shows the resulting new menu hierarchy with a new strut being found and used to calculate the width dimensions to fit in the new location, left column 40.

3. System resizes the menus to fit the new location, using the new strut.

Merging multiple menus into a single menu (merging multiple independent menu hierarchies into a single menu hierarchy):

Select First Menu System (This may be a Submenu Hierarchy of an Independent Menu System).

Drag n drop to a location in a second menu, where the drag process can open up submenus of the second menu. User points cursor at the target location menu cell item and drops, thus creating a new sibling menu item cell of the target, which effectively adds a new sub hierarchy branch to the 2nd menu system hierarchy. The system reconfigures the components of the new sub hierarchy branch to point to the new hierarchy top menu row and also menu table container. The system then finds a new strut row for the newly expanded hierarchy.

Menu Resizing: Overview:

Regular re-sizing of menus is both what keeps the menu from overwriting other page sections, and insures that the menu will be as visible as possible at all times.

Menu blocks are resized upon initialization, on conclusion of drag and drop operations, by the insertion or removal of page sections (HTML code) and whenever the web page, or page sections containing a menu, changes size or shape.

Figure 10:
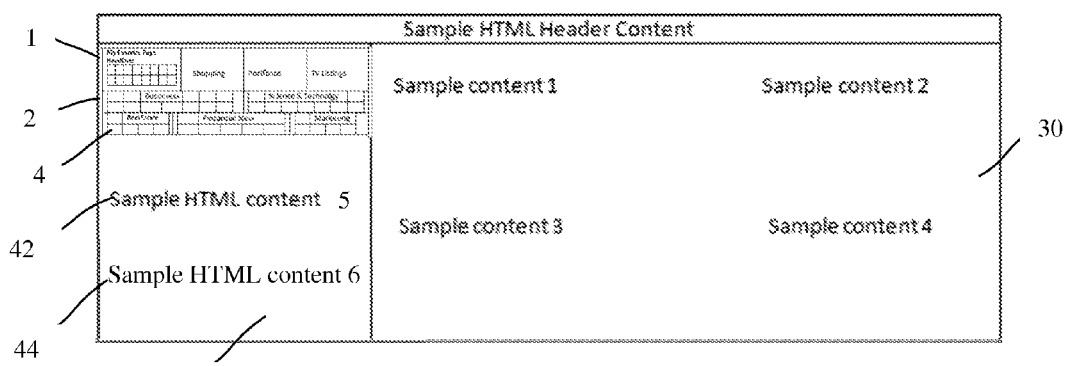
FIG. 10 shows the dragged menu system dropped into a new web page location and resized to fit the new width dimension of that location.
Figure 14:
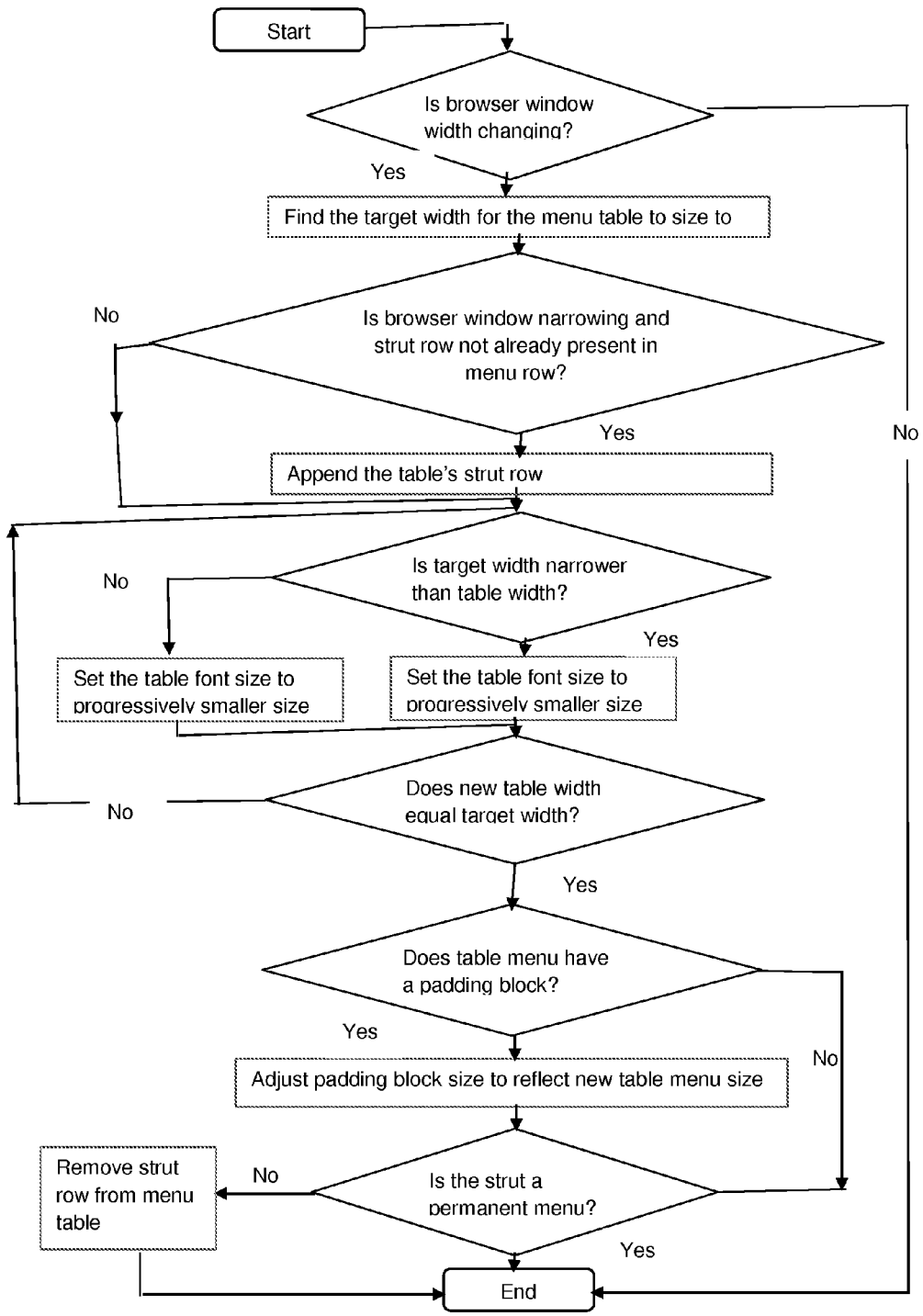
FIG. 14 shows menu resizing algorithm flow chart logic.

FIG. 10 shows how a menu resizes itself to fit into the new page dimensions following a relocation in the menu page and FIG. 14 shows menu resizing algorithm flow chart logic.

Resize typically occurs when the user grabs the browser window and drags to expand or narrow the browser. First, the resize operation determines if the page is expanding or narrowing and what the target width for the table menu should be.

Next, we select the appropriate table menu strut row, make it invisible, append it to the table menu, then use font size to narrow or expand the table menu width to fit the target width. Simultaneously, table menu items, including the strut row, can be changing shape as label text breaks into separate lines or reforms into single lines.

By changing font size we force the table to be recalculated, and with the strut row present, we insure that the entire menu table will resize in a uniform manner to the dimensions of its largest row; this prevents the table from jumping in size when rows of differing sizes are added or removed from the table, even AFTER we've removed the strut row.

If the resize action is being done in a continuous manner, for example, while the user is resizing the browser window, continuous resize events will be most likely be generated, depending on browser. Because on every resize event the strut row (and its menu table) are fitted exactly to the width of its parent menu location block, the next in a continuous series of resize events will find a mismatch between the menu table size and the strut row, thus a sizing adjustment will occur. The effect is a table menu that resizes in a smooth and continuous manner which corresponds to web page size and dimension changes.

The presence of the strut row in the table menu is particularly important when the web page section containing the menu is being squeezed down or narrowing in size. This is because table cells collapse down at that point, and the degree of collapse is determined largely by the dimensions of the menu table relative to the dimensions of its containing page section (its page location parent block element). Thus the strut row acts a lever to help collapse menu item table cells, and at the conclusion of resizing the menu rows have a uniform width appropriate to accommodate the widest row when it is inserted, and this prevents jumping in menu table size upon row insertion.

The significance of the strut row is that is has variable shape and dimensions, and thus acts as a pseudo spring mechanism. By contrast, if the menu table were set to a static width, it would act as a strut, preventing the parent location block from narrowing, so then it would be impossible to know what size adjustments were necessary.

Another important reason for insertion of the strut row during table menu resizing is due to the nested structure of table menus (FIG. 3), where menu items are absent a uniform column alignment—depending on the browser, this may make uniform sizing of the larger menu table difficult to accomplish in DHTML applications.

An alternative embodiment to force table collapse is to directly change the width attribute of the menu table. This approach could be used when the web browser does not support any parent element containment of absolutely positioned children.

The menu is fitted to the new target width by a loop that tests progressively larger or smaller text sizes relative to the current menu font size. Because each menu block is outside the page flow of its location ancestor elements, such sizing occurs almost instantaneously without side effects on the larger page such as reformatting or recalculation.

Menu size and shape can be controlled by user specified minimum or maximum font size properties, and also by requiring the menu row to have a certain width to height ratio, effectively keeping fonts from getting too big or too small. Controlling shape aspect ratio improves use of the menu interface; for example, preventing menu items from becoming too narrow helps prevent the cursor from accidentally moving off of the current menu row being traversed. Conversely, menu items, which are too tall, may have label text, which is difficult too read.

Font sizes applied to the larger menu will normally have a sizing effect on all text of relative size contained within the menu due to the nature of cascading style sheets (CSS) attributes, thus application of different font sizes will normally cause the menu to shrink or grow in size.

After resizing is completed, the strut row is removed and the size of the padding block is adjusted to mirror the new size of any permanently displayed submenus.

The resize function also records measurements of the present dimensions of the menu.

Resize Start:

To improve performance, filtering of resize events can be applied which limits the number or type of resize events the system responds to. Filtering can be tuned if desired.

Resize Conclusion:

At the conclusion of a series of resize events, the system can execute a routine to reset the state of the menu, such as centering of submenus/independent menu blocks, or making adjustments to a padding block, etc.

Transient Menu Display:

Menus/submenus are displayed or hidden by cursor movement into or out of the active area of a menu item. If displaying a table menu row, the row is appended to the end of the tree of currently displayed table rows—if hiding a table menu row, the row is removed from the end of the currently displayed table rows.

Selecting Menu Component Dimension or Font Size:

Any component of a menu (menu rows/columns, menu items, or the entire menu) can be dynamically resized by grabbing the edge of the component and dragging, or by use of controls that specify specific or relative font size. The menu then automatically adjusts itself to properly fit itself to its parent block element dimensions. If the new menu size is larger in width than the parent dimensions, the menu adjusts it's padding block to work as a strut to force open the parent element dimensions, thus preventing the menu from covering up or obscuring other pieces of the web page. Sizable components include individual menu items, menu rows/columns and the entire menu itself.

Figures 5, 6, 7:
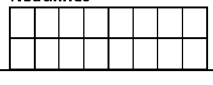
FIG. 5 shows how submenu rows can open in the up direction instead of the normal down direction.
FIG. 6 shows how left and right sidepads are used to center menu cells underneath their parent menu row menu cell.
FIG. 7 shows a large and complex piece of web page HTML (TV listings) is can be used as a part of the menu table (the menu is the web page).
Figure 8:
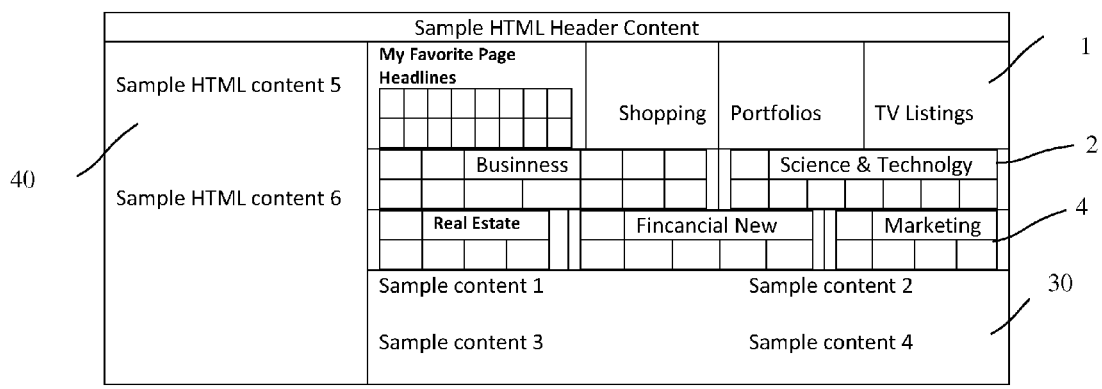
FIG. 8 shows permanent menus opened and pushing down content web content beneath them.
Figure 9:
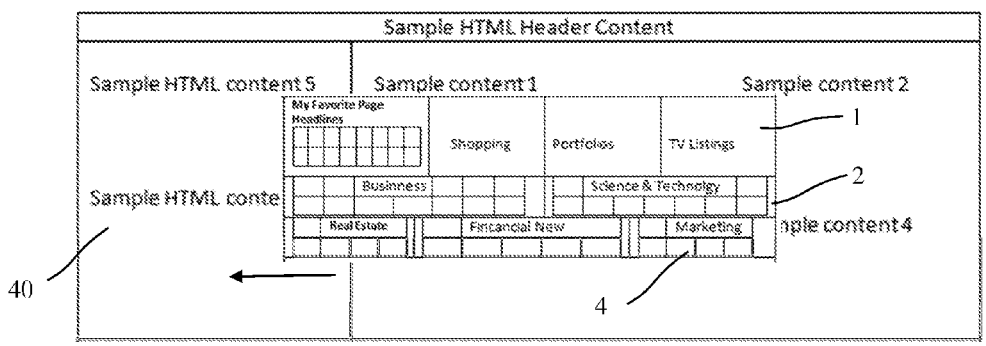
FIG. 9 shows entire menu system being dragging to a new web page location.

Page Panel/Section Display—Permanent Menu Display:

Permanent menus are specified either through the menu data script or by a interactive selection such as clicking on or in the desired menu. When the cursor leaves the active menu region, first any transient menus disappear, and then any permanent menus are displayed and remain displayed until the cursor returns to the active menu region. While displayed, permanent menus are fully active and they can be navigated just like other menus. Because menus can contain any HTML code, permanent menu display can be used as a means to quickly navigate to and open up page panels/sections—even entire pages. FIG. 6 shows permanent menu 20 which is in essence a page panel or section.

Drag and Drop:

Menus, menu components or copies or either, can be dragged and dropped into another web page location, including inside another menu. Upon being moved, the menu automatically resizes itself to fit inside of its new parent block element location. The menu can also be added as a submenu of another menu item.

To initiate dragging, the user moves the cursor over a special control area of a movable menu component. A special movement cursor type can appear automatically in such regions or the user can explicitly select a start drag control, for example by mouse click. Next, the user holds down a mouse or pointer control button while moving the cursor to the desired component page location—Normally the system will indicate that dragging is occurring by display of a small facsimile or abstract icon symbol of the menu component near the moving cursor.

Selecting the Drop Location:

A component can be dropped into any web page HTML block level element. As the drag cursor moves, the system gives the user visual cues that help show what the nearest block level element under the cursor is; this can include highlighting of elements inside the block or highlighting the boundaries of the block, etc.

Figure 12C:
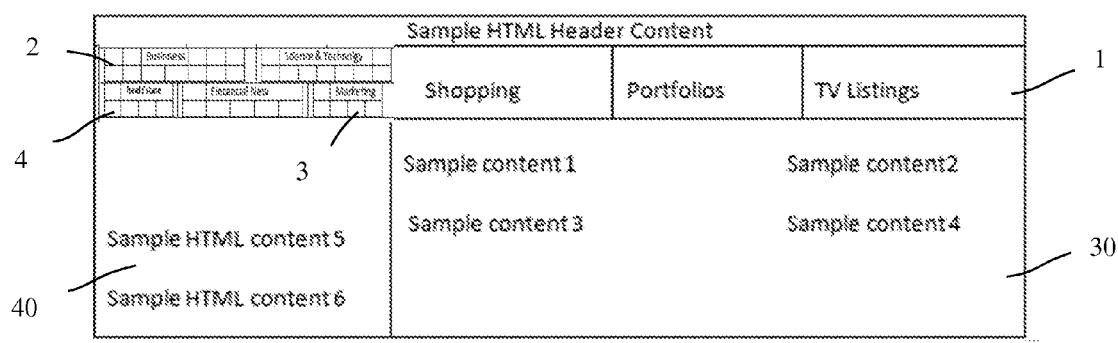
FIG. 12C shows how removal of permanent menu row display causes web content underneath it to return to normal vertical placement after the padding block is gone.
Figure 12D:
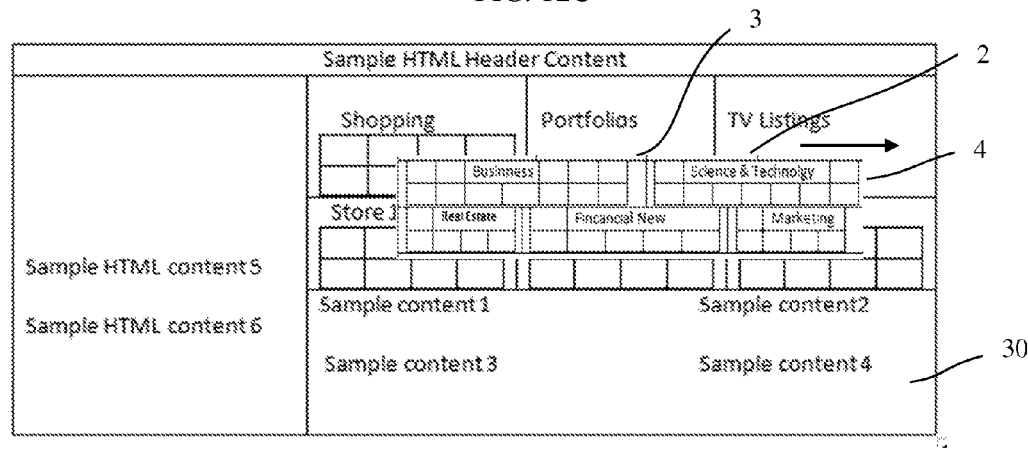
FIG. 12D shows editing of menu row hierarchies, where 2 independent menu row hierarchies are merged by drag and drop. It also shows how the cursor is used during drag and drop to display submenu rows.
Figure 12E:
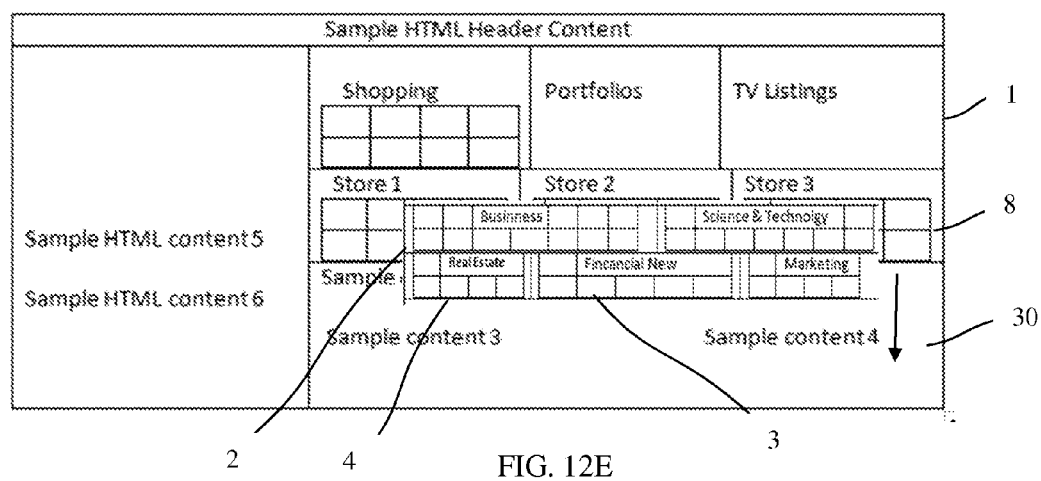
FIG. 12E shows editing of menu row hierarchies, where 2 independent menu row hierarchies are merged, and user is selecting drop location in a submenu row.

Dragging into Other Menus:

Cursor drag movement can be used for normal menu traversal, allowing the user to find and open the target drop location, thus permitting menus or menu components to be moved inside of other menus. This is illustrated in FIGS. 12A-C, where FIG. 12A shows the initial menu blocks, FIG. 12B shows the smaller menu block 32 being dragged, which opens up menu 20. Next, FIG. 12C shows dragged menu block 32 dropped inside of menu 20 into nested position 34.

Figure 11:
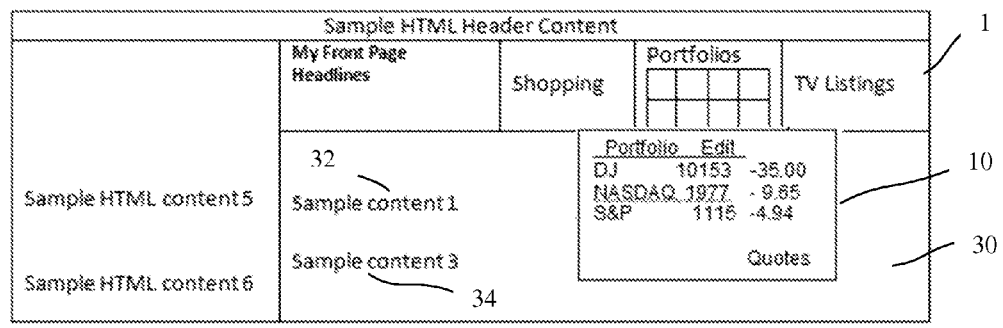
FIG. 11 shows use of a submenu which is random column shaped web page HTML content, which is part of the logical menu hierarchy, but is not itself placed in the menu table structure which controls it. This allows it to show web content under it, to right and left.

FIG. 11 shows a column menu block 10, which does not use a padding block, to allow display of text underneath to left and right.

Menu Navigation and Display: To display menus, the user moves the cursor across a menu, any menu item entered will, if it has one, display a submenu. If the menu item has no submenu, then any currently displayed submenus belonging to sibling menu items will disappear.

A menu item's submenu, if any, will be display upon cursor entry into the menu item region; the submenu will disappear upon the cursor exiting the current menu item and entering a contiguous neighboring menu item.

Normally the submenu displayed will normally be contiguous to it's menu item's menu, but a submenu can be displayed anywhere on the web page. For contiguous submenu display, the user can dynamically select the direction of submenu display: up, down or alternating direction.

Menu/Submenu Opening or Display Direction: The user can dynamically choose the constant direction of submenu opening, either up/down, or right/left. Up direction is achieved by two methods of absolute positioning. The first positions individual table menu rows above where they normally would be. The second method adjusts the entire table's position. The positioning routines have to make adjustments for the position of the top menu row position created by the static padding block.

Figure 4:
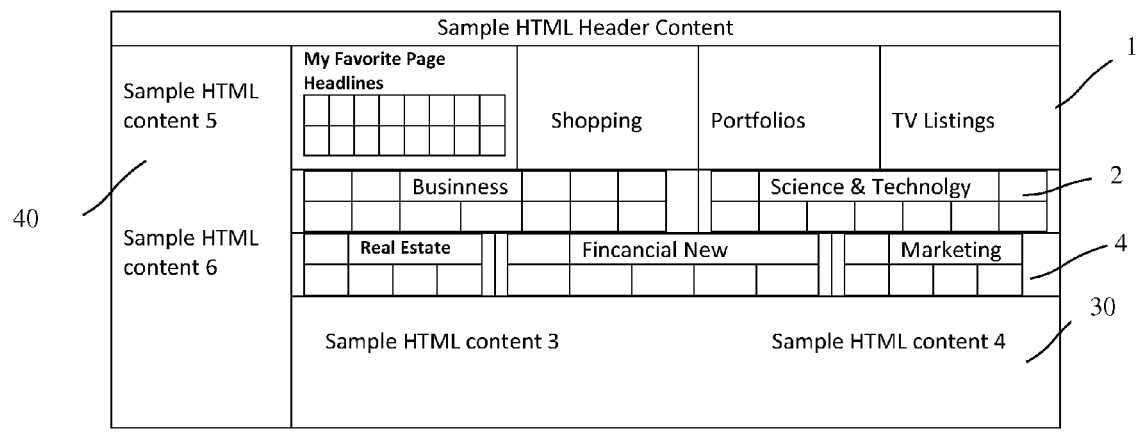
FIG. 4 shows how mouse-over event menu row cell drops displays a the next submenu row in the menu row hierarchy.

FIG. 4 shows menu rows 2 and 4 opening in a down direction; FIG. 5 shows same menu rows opening in the up direction.

Menu Item Label Magnification (improved readability for small fonts): if menu fonts become too small or visibility is otherwise impaired, the user has the option of using a magnification feature which displays the menu item label under the cursor in a special magnification box with extra large fonts. The magnification display box can be positioned anywhere on the page or on top of the present menu.

Compact Alternating Submenu Display

In order to reduce screen space requirements, submenu display can occur in alternating directions, with a repeating vertical pattern of up/down style, or a side to side left/right style (with the exact pattern determined by the first direction of menu display). This allows the user to navigate into indefinitely deep submenu levels while using a maximum screen area equivalent to just 2 submenus, since the menu screen space is constantly reused.

Rows are alternated by use of absolute positioning of table rows.

Figure 13A:
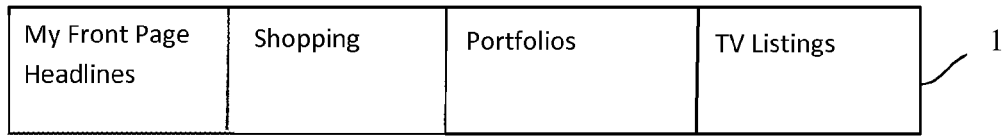
FIGS. 13A-13J shows a detailed sequence of steps demonstrating how alternating menus operate and how they can be navigated using the quad control toggle mechanism.
Figure 13B:
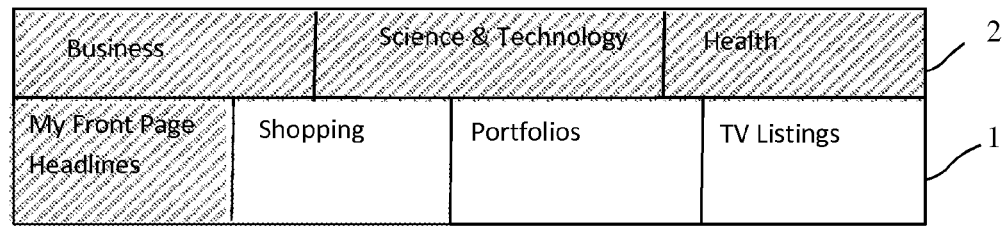
Figure 13C:

FIG. 13B shows the user activating menu item which opens menu row 2 in the up direction. FIG. 13C shows the user next traversing table menu row 2 to open submenu row 4 in the alternating (down) direction.

Navigation of Alternating Display Menus:

The user can navigate backward or forwards in the current alternating direction traversal path by use of a quad controller. The controller is a 2.times.2 table of 2 contiguous rows with 2 aligned columns, allowing the user to move seamlessly between the 4 contiguous selector regions. One column contains backward direction selectors, the other forward direction selectors. The top quad row corresponds to the top menu, the bottom quad row to the bottom menu row.

The quad control is displayed vertically centered on top of the current submenus, with the top quad selector row positioned over the top submenu, and the bottom selector row positioned over the bottom submenu. Effectively the quad control is vertically centered on the axis or edge where 2 contiguous submenus touch, straddling both evenly. Thus each of the alternating menu rows has positioned on top its own corresponding control row, allowing backward or forward movement from any alternating direction menu.

The quad control is horizontally centered over the present menu item (where the cursor resides), but may partially cover neighboring menu items.

This positioning and centering allows the user to move seamless, with minimal traversal distance, into the quad control from the current menu item.

The quad control is made small enough that the user can easily dismount the control by seamless moving off into either the top or bottom displayed menu.

The quad control is composed of 2 opposite diagonal groupings, each with a back/forward selector in different columns, but with only one group active at a time. FIGS. 13A-J shows quad control 20 with two opposing diagonal selector groups: diagonal1, consisting of Back selector 28, and Forward selector 22 and diagonal2, consisting of Back selector 26, and Forward selector 24. Back selectors hide submenus; Forward selectors show submenus. The selector action is applied to the submenu row in the opposing direction (above or below the selector if vertically alternating menus, to right or left if horizontally alternating menus), but not the submenu the selector is directly positioned over. Cursor movement into a selector first triggers the selector action, then deactivates the current selector's diagonal group, then next activates the opposite diagonal selector group. The effect is that after a selector action, the user can move in the reverse direction by moving sideways, or take the same action again by moving up or down. Such up/down movement into an active forward selector intuitively mirrors the normal action as if the user had moved from a menu A into a child submenu B: a child of B, submenu C, will be displayed.

This design allows the user to navigate back and forth through the list of presently displayed submenus by very small cursor/pointer motion. The control areas are activated by cursor entry and can be labeled however appropriately.

The user can initiate display of the quad controller by any number of methods. The user may, for instance, display the quad control by moving the cursor towards the outer edge of any menu item. The quad control remains displayed until the user moves into and then out of it. The quad control is hidden upon the cursor exiting the quad controller area into any neighboring menu item region, or by the user simply never entering the quad control but just moving into a neighboring menu item instead. Upon exiting the quad control, the menu or submenu exited is now the currently displayed menu, and the user can continue normal menu navigation.

Figure 13D:
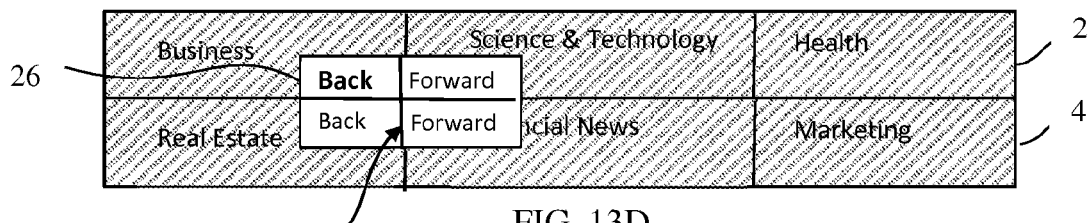
Figure 13E:
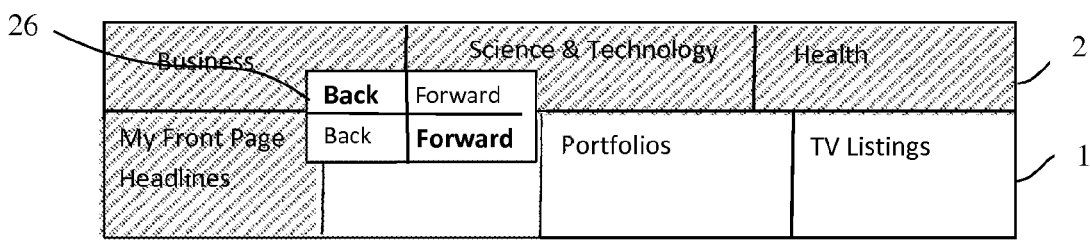
Figure 13F:
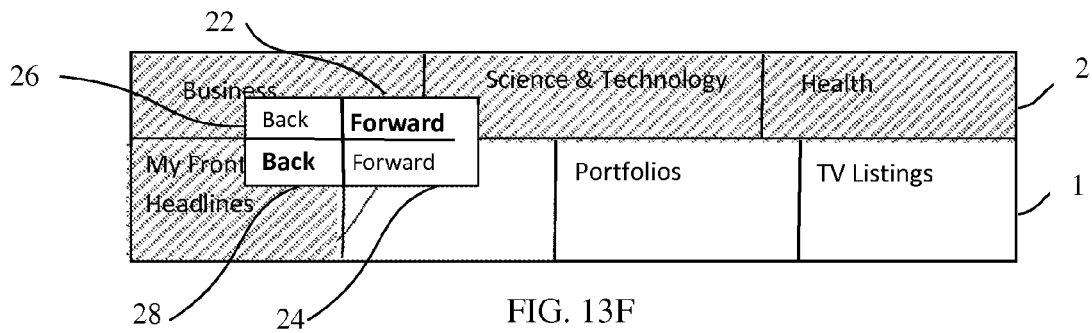
Figure 13G:
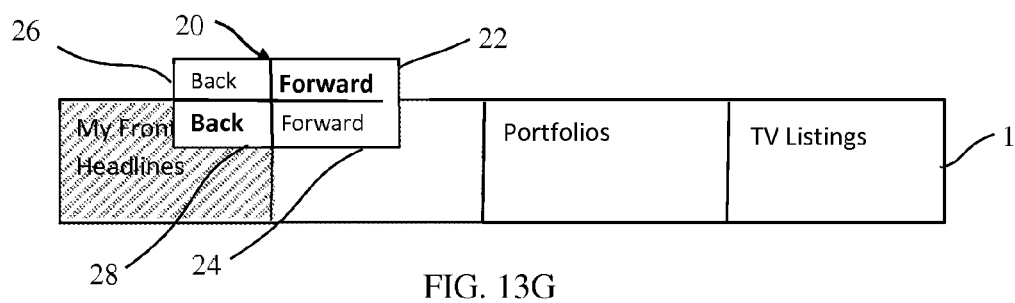
Figure 13:
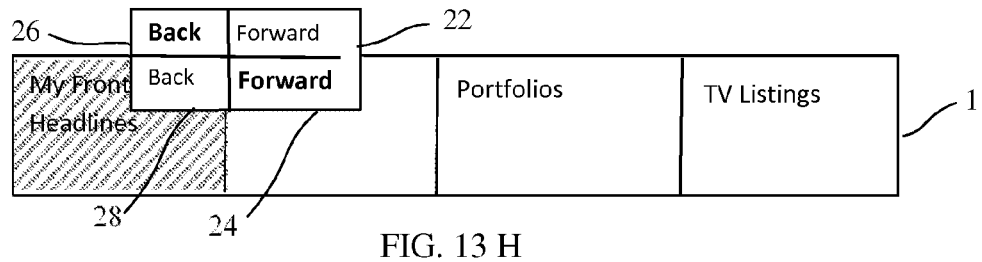
Figure 13:
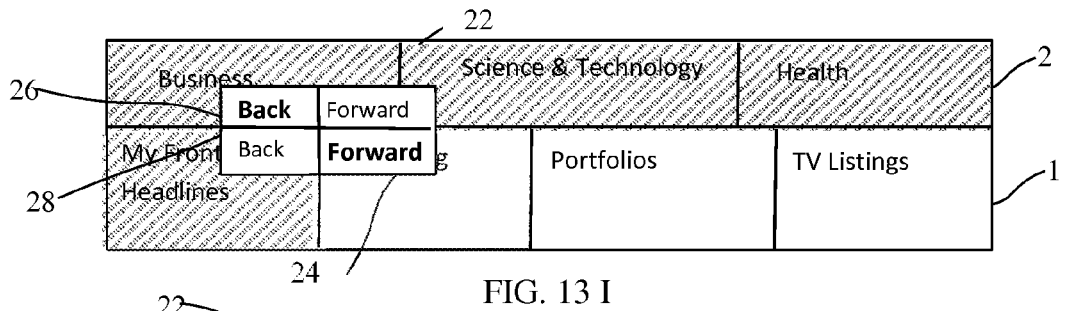
Figure 13:
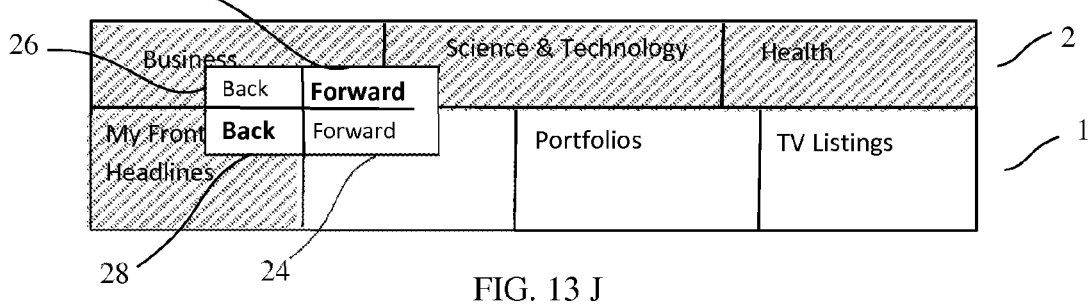

FIGS. 13A-J illustrate navigation of vertically alternating submenu rows: FIG. 13A shows starting permanent top menu 1. FIG. 13B shows submenu 2 opened in the up direction. FIG. 13C shows submenu 4 next opened in the down direction. FIG. 13D shows initial display of quad control 20, with only Back selector 26 active (active selector state is shown in bold type), as the user can only navigate backwards from this point. FIG. 13E shows submenu 4 hidden by the action of Back selector 26. FIG. 13F illustrates how the action of selector 26 subsequently de-activates its diagonal group, then next activates the opposing diagonal selector group (selectors 28 and 22) FIGS. 13G-H also shows the same pattern while navigating further backwards to return to top menu 1. FIGS. 13I-J also shows this same pattern, but instead navigating forward to return to display of submenu 2.

Dynamic Menu Addition: New menus/menu items (any html block) can be dynamically instantiated and added to an existing menu. The user simply drags and drops the new menu into the appropriate location—if a table menu, a new strut and resizing is then automatically calculated.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

In the field of information technology there is significant interest in displaying and navigating data using web-browsers and HTML web-pages. Such a method of displaying and navigating data would be of considerable utility in, for instance, the financial services industry, the consumer software market and in industrial and commercial web-design. Such a method of displaying and navigating data would also be useful in any industry or application where tabular data such as, but not limited to, television schedules, train, bus or airline schedules, sports statistics and medical data or records need to be displayed.

While the invention has been disclosed in terms of an exemplary embodiment, it will be apparent to one of ordinary skill in the art that many modifications can be made to the disclosed method and apparatus without departing from the spirit of the invention. Therefore, it is the intent of the appended claims to cover all such variations and modifications as come within the true spirit and scope of this invention.

Appendix A: Definitions

Computer Device: A computer device comprising a central processing unit, and preferably equipped with a pointer device (like a mouse or trackball), and with a windowing operating system. The computer should be capable of running a web browser or related software that displays HTML based web pages. The browser must provide good support of dynamic HTML (DHTML), based on the W3C HTML, DOM and CSS standards as detailed by the World Wide Web Consortium (W3C) of Cambridge, Mass. USA, and must support a DOM manipulation language, for example JavaScript, JScript, or VBScript. Examples include, but are not limited to, an Intel Pentium processor, running one of Microsoft Windows 95/98/2000/NT/XP operating systems.

Web Browser: The browser or related software should support HTML block level element independent page/document flow; this means that any block level page element, and its descendants, can be formatted or calculated independently of its ancestor elements in the web page document tree structure. In a preferred embodiment, the web browser provides this functionality through good support of the CSS absolute positioning attribute, which currently is the normal means of achieving this functionality. The term "absolute positioning" in this document is intended to be synonymous with this functionality. Examples include, but are not limited to, Microsoft's Internet Explorer, Netscape, Mozilla or Opera web browsers.

Positioning schemes: In CSS2, as defined by the W3C, a box may be laid out according to three positioning schemes:

1. Normal Flow. In CSS2, normal flow includes block formatting of block boxes, inline formatting of inline boxes, relative positioning of block or inline boxes, and positioning of compact and run-in boxes.

2. Floats. In the float model, a box is first laid out according to the normal flow, then taken out of the flow and shifted to the left or right as far as possible. Content may flow along the side of a float.

3. Absolute Positioning. In the absolute positioning model, a box is removed from the normal flow entirely (it has no impact on later siblings) and assigned a position with respect to a containing block.

Absolute Positioning: In the absolute positioning model, as defined by the W3C, a box is explicitly offset with respect to its containing block. It is removed from the normal flow entirely (it has no impact on later siblings). An absolutely positioned box establishes a new containing block for normal flow children and positioned descendants. However, the contents of an absolutely positioned element do not flow around any other boxes. They may or may not obscure the contents of another box, depending on the stack levels of the overlapping boxes. References in this specification to an absolutely positioned element (or its box) imply that the element's 'position' property has the value 'absolute' or 'fixed'

Menu: a logical grouping of menu items, usually all contiguously displayed in a row or column form. Depending on context, a menu can also refer to a grouping of menus, such as table menu consisting of multiple menu rows. Menu rows 1-12 are shown in FIG. 1.

Menu Item: a distinct region of a menu that consists of a label (text or graphics) and optionally a border region that separates it from neighboring menu items. A menu item can have zero or many submenus, but typically has just one submenu. Menu item 11 is shown in FIG. 1.

A menu item region can contain any HTML tree, including frame elements containing entire web pages. The menu item region can be active and respond to events such as button clicks and pointer/cursor entry or exit, typically for submenu display/hiding. A menu item can contain multiple active regions, each of which can have different event handlers/associated actions.

A menu item is normally a block level element, but can also be any displayable html element that can respond to pointer events like movement or button clicks, etc.

Menu Side Pads: Menus use adjustable side pads to dynamically center submenu items under their parent menu item—this is done to reduce the distance the cursor must traverse while navigating through a menu tree, and also to make menus easier to traverse.

The side pads, located at each end of the menu, are used like levers to push in menu items to locate them closer to their parent menu item. This action is also used to collapse menu items, creating items of greater height, which can make it easier for the user to keep the cursor inside the menu row being traversed.

In a preferred embodiment of the invention, the system keeps track of which menu and menu item paths the user most frequently traverses, and dynamically adjusts the centering algorithm to place more frequently traversed menu items closer in to their parent menu item.

Menu side pads are shown in FIG. 6 at both ends of menu row 8.

Menu Tree/Menu Group: A logical grouping of menus that represents the hierarchical branching structure of a tree, where each menu typically has one parent menu and has zero or more child submenus. The top menu represents the top of the tree and all other menus represent branches of the tree hierarchy (i.e. the menu items have a hierarchical dependency). Any menu in the tree can be reached from the top menu and traversal through one or more submenus. A menu tree spans one or more independent menu blocks. Normally menu blocks sharing the same tree are linked by logical parent/child menu relationships, where a menu row in one menu block has a submenu that is the top menu row of another menu block.

Three examples of menu groups are shown in FIG. 1, where one group constitutes the logical menu row hierarchy consisting of menu rows 1, 2, 4, 6, 8, 10, 12, and the other consist of a the composite menu row groups, 14 and 16.

Top Menu: a top menu represents the top of a menu tree or a menu block and is the main entry point to traversing the tree or block. A menu tree top menu is normally permanently displayed. An example is FIG. 1, menu row 1.

Submenu: any menu which has ancestor menus in a menu tree. Each submenu has a parent menu and menu item. Submenus are normally displayed upon cursor entry into their parent menu item region. Normally submenus are contiguous to their activating parent menu and menu item, so that the pointer device can smoothly traverse from menu item to child submenu without leaving the menu block. An example is seen in FIG. 1, menu row 8, a submenu of row 1.

Independent Menu Block: represents a menu group where all menus are descendants of a common HTML block element, and all menus are also logically related since members of the same logical menu tree hierarchy. A menu block can represent an entire menu tree or just part of a tree. A menu block can be used to display submenus that have disparate shapes and sizes relative to the parent menu block. FIG. 1 shows independent menu blocks 14 and 16.

In a preferred embodiment, if a menu tree consists of multiple menu blocks, a child menu block is normally appended as child of the parent menu block's container.

Menu Pop-ups: Any menu block can be a pop-up and can appear anywhere on the web page. A pop-up menu normally is not inserted into the page, but instead floats on top. The pop-up display is transient—it only remains visible while the cursor is over the menu. FIG. 1 shows menu row 12 with popup menu group 14 and 16.

Menu Block Container: used to give the menu block an independent page/document flow, which allows dynamic actions such as submenu display or resizing to be executed extremely rapidly without causing reformatting/resizing or recalculation of the larger web page.

The container can also be used to squeeze down the size of a child menu block, thus simulating the effect of a narrow column despite the lack of a constraining page policy, such as a left or right page column. The menu block width attribute can be directly manipulated in the same way.

The container consists of at least one or more absolutely positioned block elements and is the parent block element to the menu block. (Container blocks are not required to be absolutely positioned, as long as it has CSS or other attributes that give the child menu block an independent page flow. In fact, if there are alternative ways to create independent page flow for a menu block, the container may not be necessary.)

In a preferred embodiment a container consists of a nested pair of absolutely positioned block elements. This structure is an effective mechanism to isolate the child menu tree/block structure from various CSS margin and offset calculations of ancestor elements in the web page document tree. Alternative embodiments can use a container consisting of just one absolutely positioned block element, but there is a higher risk of positioning problems. Another option is to combine the previous alternative with an absolutely positioned menu block.

Page Menu Location: can be any block level element in a web page or menu. When a menu block is positioned/inserted in a web page, normally the menu block's container (holding a child menu block) is actually positioned/inserted as a child element of the location element. The page menu location normally should be dynamically set to CSS relative positioning, or alternatively to absolute positioning.

A Table Structure: A 3WC defined HTML specification for displaying data in tabular form.

Table Menu: a specialized type of menu block, built from an HTML table element, where each row of the table represents a menu/submenu.

Table Menu Row: each table menu row consists of a table row with another table and table row nested inside of it. The reason for this nested structure is so that menu items inside each menu row can line up independently of menu items in other rows. Without this type of nested structure, tables normally force all table cell widths in all rows be to aligned together in columns, thus requiring more screen space than necessary.

Table Menu Strut Row: Each Table Menu has a specific row identified as the strut row—normally this row represents a widest row in the table under certain circumstances. The strut may be used to keep the menu table a uniform width as rows of different widths are added or removed. There can be multiple strut rows. In one embodiment, the selection of a strut row may be processed by a computational thread which is independent of the computational thread used for display or for document flow processing.

If the strut row is unusually large such that it would pose a performance drag, other more lightweight strut mechanisms can be used. For example, the system can construct a character height row that will shrink and grow in width as different font sizes are applied to the table menu. But the downside is that this simulated strut will not have the exact sizing behavior of the actual strut row.

Permanent Menus: menus that may be displayed after the cursor leaves the active menu region; they remain displayed until the cursor returns to the menu region. They represent a path through a menu tree consisting of a submenu and any ancestor menus, including the top menu. Permanent menu display can be used as a means to open page panels or sections, thus dynamically reconfiguring the page. FIG. 4 shows permanent menu rows 1, 2, 4, while FIG. 5 shows the same submenu rows opening in a upwards position.

Figure 3:
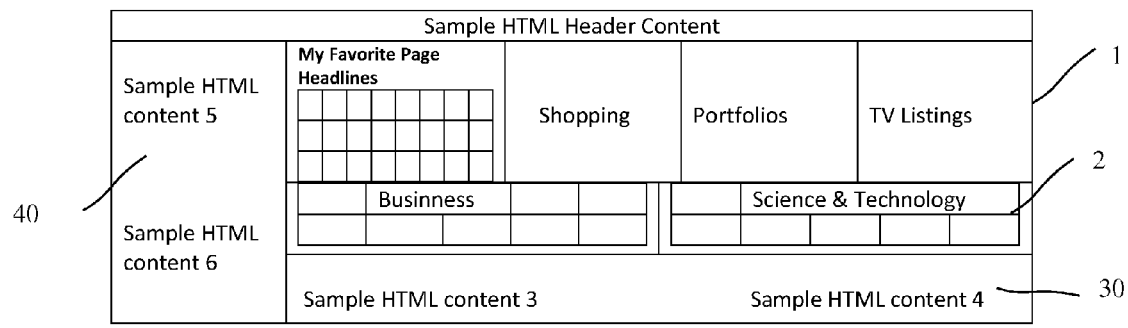
FIG. 3 shows how mouse-over event menu row cell displays the first submenu row in the menu row hierarchy.

Transient Menus: menus that may be displayed/hidden upon cursor entry/exit of a menu item active region. Such menus are usually inserted in the menu block on display and then removed when hidden—this is to prevent such menus from covering up and disabling active underlying parts of the web page. FIG. 3 shows transitional menu row 2.

Padding Block: Each menu block may have an optional padding block which may be used to create an empty space inside of the menu block's page location static block element—the space created is exactly the size of the displayed menu block including any permanently displayed submenus, including the top menu. The padding block may also be used as a vertical strut to keep permanently displayed menus from covering up the page underneath. The padding block should not act as horizontal strut since this will prevent the menu block from properly narrowing down as the page narrows. The padding block can be an exact mirror duplicate of the rows that make up the permanent menu display, or it can just be a block element with a static height value settings. The mirror approach is more accurate but can slow performance if too large in size. In a preferred embodiment, the padding block is part of the document flow, while the menu block is absolutely positioned, and therefore is outside of the document flow. FIG. 4 and FIG. 5 shows the before and after effect of the padding block creating vertical spacing for permanent menus.

Menu blocks that typically do not use a padding block are Pop-ups and irregular shapes such as columns, etc.

Menu Data: A script which may be a blueprint for how to build menus, including user preferences. It may define the organization of menus and menu groups, including the hierarchical organization of menu rows. The script may also describe menu properties such as location in the web page, colors, and optional properties such as min/max dimensions or min/max font size. The script also defines menu item properties like labels, colors, borders, selection actions or URLs, etc. Labels can directly contain or load HTML code, or can contain references (via element id attributes) to sections of the web page to be copied or moved into the menu item.

Resize Attribute: A resize attribute may be a parameter such as, but not limited to, a column width, a relative column width, a font size or type or a text-wrap requirement, that may be used to display an HTML element, such as, but not limited to, a table element, when the browser window is resized, or the display area containing the particular web-page or element of the web-page containing the HTML element, is resized.

In a preferred embodiment the script syntax is the same as the DHTML or DOM manipulation language being used (for example Javascript/JScript/VBScript) since this improves performance; however, any syntax could be used to describe the menu data.

Autolayout Algorithm: The W3C specifies a two-pass auto-layout algorithm. In the first pass, line wrapping is disabled, and the user agent keeps track of the minimum and maximum width of each cell. The maximum width is given by the widest line. Since line wrap has been disabled, paragraphs are treated as long lines unless broken by BR elements. The minimum width is given by the widest text element (word, image, etc.) taking into account leading indents and list bullets, etc. In other words, it is necessary to determine the minimum width a cell would require in a window of its own before the cell begins to overflow. Allowing user agents to split words will minimize the need for horizontal scrolling or in the worst case, clipping the cell contents. The algorithm details actions to be taken if If the number of columns is not specified with COL and COLGROUP elements, then the user agent should use the following autolayout algorithm. It uses two passes through the table data and scales linearly with the size of the table.

Quad Toggle Element: A quad toggle element may be a pop-up menu having four quadrants. In one embodiment, when popped up the top left element may represent a choice of a next menu going forward in the hierarchy, the top right element may be blank, the bottom left element may be blank and the bottom right element may represent a choice of going back in the hierarchy. As the quad toggle element straddles two menu items, when a choice is made, a second version of the quad toggle element appears, in which the top left element is now blank, the top right element represents go back, the bottom left element represents forward and the bottom right element may be blank. The next menu item is shown in the row under where the selection occurs. In this way, the selection is made, and the user automatically dismounts onto the selected menu item, while the quad toggle remains actively displayed. FIGS. 13A-J show examples of the quad control with quad diagonal activation zones 22, 24, 26, 28.

Definition of Menus (Descriptive Interface Language)

Purpose: describes multiple menu systems/hierarchies describes the placement locations of menus in the web page, including the placement of menus nested inside of other menus.

Describes the Submenu Hierarchies

Describes menu attributes like label text, CSS properties such as highlighting attributes, colors, borders, font sizes and user preferences (min/max font sizes, etc.)

Can directly contain verbatim structured web page HTML content placed directly in menu cells, or can contain pointers to web page HTML content that can be copied or moved directly from the web page into a menu cell.

It can also contain URLs which are used to load web page content, for example, into an HTML frame element inside a menu cell.

The description can also hold data or metadata about menu content and structure, and instructions on how to dynamically transform this data or metadata into menus. An example is XML formatted data (which also might include metadata) and XML transformation instructions (typically an XSLT script) which describes how to dynamically produce both menu structures, hierarchies and menu HTML content.

What is claimed:

1. A menu navigation system, comprising:
    a top and a bottom submenu displayed as contiguous regions on a display screen;
    a quad controller comprising a top and a bottom forward-selector region and a top and a bottom back-selector region, and wherein said top selector regions are both located overlaid over a portion of said top submenu, said bottom backward selector regions are both located overlaid over a portion of said bottom submenu, and all selector regions are displayed as contiguous regions on a display screen;
    said menu navigation system further comprising software coded such that the following actions occur dependent on which of said quad controller's selector regions are active and selected:
        selection of an active top back-selector region causes a parent submenu to be displayed over said bottom submenu while selection of an active bottom back-selector region causes said parent submenu to be displayed over said top submenu; and
        selection of an active top forward-selector region causes a child submenu to be displayed over said bottom submenu while selection of an active bottom forward-selector region causes said child submenu to be displayed over said top submenu.

2. The menu navigation system of claim 1 wherein said parent submenu is the submenu that immediately proceeds, in a menu hierarchy, the submenu over which said active back selector is located.

3. The menu navigation system of claim 2 wherein said child submenu is the submenu that immediately follows, in said menu hierarchy, the submenu over which said active back selector is located.

4. The menu navigation system of claim 3 wherein said selector regions are made active in mutually exclusive diagonal pairs.

5. The menu navigation system of claim 4 wherein said mutually exclusive diagonal pairs are toggled after the action of a selection is completed.

* * * * *